Figure 1:
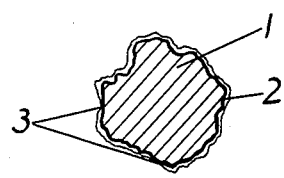

July 12, 1966  H. GRUENE ETAL  3,260,576
POROUS SINTERED BODY AND METHOD OF PREPARATION
Filed April 25, 1963

INVENTORS:
HORST GRUENE
EDUARD JUSTI
AUGUST WINSEL

By

AGENT

United States Patent Office 3,260,576
Patented July 12, 1966

3,260,576
POROUS SINTERED BODY AND METHOD
OF PREPARATION
Horst Gruene, Eduard Justi, and August Winsel, Braunschweig, Germany, assignors to Siemens-Schuckertwerke A.G. and Varta Aktiengesellschaft, Berlin and Erlangen and Hagen, Westphalia, Germany, respectively, both corporations of Germany
Filed Apr. 25, 1963, Ser. No. 276,697
Claims priority, application Germany, Apr. 28, 1962,
A 40,089
3 Claims. (Cl. 29—182.5)

The present invention relates to improvements in the manufacture of porous sintered bodies and to such porous sintered bodies.

Due to the high porosity and electrical conductivity of the sintered bodies of this invention, they are particularly useful in battery and fuel cell electrodes, and for this reason, they will be described hereinafter in connection with this preferred use.

Sintered bodies designed to hold electrochemically or catalytically active masses have to meet the following requirements:

(1) They must have sufficient mechanical strength and rigidity to serve in an electrode.
(2) They should have the highest possible porosity.
(3) They must have good electrical conductivity.
(4) They must resist corrosion by the electrolyte used in the battery or fuel cell wherein they serve as electrodes.

To make such sintered bodies commercially useful, it is highly desirable that they also have a low specific weight and should be cheap to produce.

Conventional sintered bodies are comprised of powder grains of sufficiently ductile metals, metal alloys, or mixtures thereof to become sintered together when subjected to pressing and simultaneous or subsequent heating to the temperature of the softening range of the ductile metal. To bring the powder grains into good contact and to interlock them into a mechanically strong body, it is necessary so to choose the sintering conditions, i.e., pressure and/or temperature, that the ductile material becomes fluid. This has the following disadvantages:

As the ductile pulverulent material becomes more fluid and the grains interlock more efficiently to increase the mechanical strength of the sintered body, the porosity, i.e., the ratio of interstices to total volume, decreases correspondingly since the powder grains are deformed and the interstices become filled with the fluid grain material. Thus, the first two requirements named hereinabove are inherently contradictory and one must necessarily be sacrificed for the other in some sort of a practical compromise.

Also, only a few metals, such as nickel, cobalt, copper, and silver, for instance, can be sintered at economically acceptable temperatures and have, at the same time, the required resistance against the electrolyte and the electrochemical reactions at the electrode. The common characteristic of all these metals is their ductility but this very property makes it difficult to pulverize them since only brittle materials can be finely ground. For this reason, it has been necessary to prepare these metal powders electrolytically, by chemical reduction, or by thermally decomposing their gaseous inorganic or organic compounds. All of these methds are quite expensive.

It is the primary object of the present invention to overcome these disadvantages and to produce electrically conductive, highly porous, and mechanically strong sintered bodies economically.

This and other objects and advantages are accomplished in accordance with this invention with a porous sintered body which is at least partially comprised of powder grains consisting of a core and a coating of an electrically conductive material having a ductility surpassing that of the core material. The core material should be brittle so that it cannot be sintered under the conditions at which the ductile coatings are sintered together and the coating covers at least a major portion of the core so that, upon sintering together of the ductile coatings of adjacent grains, a mechanically strong and rigid porous body is produced.

It is of particular advantage in the practice of the invention that the brittle core material may be nonmetallic, such materials as sand and ceramic or glass dust being very useful for this purpose since they will not be deformed under the sintering conditions for the ductile coatings.

Since the core material need not be adapted for sintering, it may be chosen according to other desired characteristics, such as specific gravity, grinding quality, and price. In addition to the nonmetallic materials, brittle metal alloys, such as iron or tungsten alloys, as well as semiconductors, such as bismuth minerals, for instance, tellurides, phosphides, and selenides of bismuth and the like, may be useful as core materials. They are coated with a film of the ductile coating, which is quite thin in relation to the core radius and need not cover the entire surface of the core.

The common characteristics of the core materials useful for the invention are their brittleness, their ability to retain their shape at least substantially under the sintering conditions, their lack of substantial ductility and their corresponding inability to be sintered effectively under normal sintering conditions, all of these characteristics going hand in hand and being equivalent to one another in respect of the present invention.

Many materials, which meet these demands have a lower absolute specific gravity and are not so expensive as for instance ductile metals like lead, nickel, copper or silver.

Such porous bodies are prepared by coating powder grains of a brittle material with a thin film of a ductile, electrically conductive material and subjecting a layer of the coated grains to such sintering conditions, i.e., pressure and elevated temperature, that the ductile films of adjacent grains are sintered together while the brittle material of the grains remains substantially unchanged.

Figure 2:
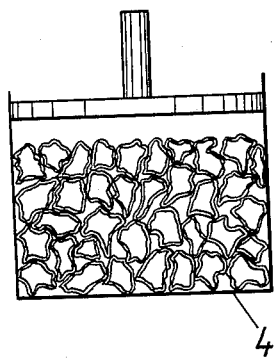

The above and other features of the invention will be more fully explained in the following detailed description of certain preferred embodiments thereof, taken in conjunction with the accompanying drawing wherein FIG. 1 is a cross section of a coated powder grain according to this invention;
FIG. 2 shows the preparation of a porous sintered body in a press; and
FIG. 3 illustrates the sintered body composed of the coated grains of FIG. 1.

Referring now to the drawing and first to FIG. 1, the powder grain is shown to consist of a nondeformable core 1 and a thin film or coating 2 of a ductile and electrically conductive material. As shown at 3, some spots of the surface of core 1 are not covered by the coating 2, which will happen with certain coating methods and makes no difference for the effective operation of the present invention, as long as a major portion of the surface is covered by the coating, i.e., at least in excess of 50% of the surface area, preferably at least about 85% of the surface area.

FIG. 2 illustrates the production of a sintered body in a press 4. As shown, the coated grains are formed into a layer in the press and are then subjected to pressure, a suitable temperature being applied to the grain layer during or after pressing to fluidize the ductile films of the grains and to sinter them together, as is conventional in sintering.

Figure 3:
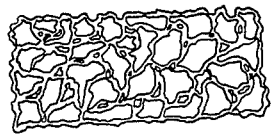

As shown in exaggerated form in FIG. 3, the pressure has caused the grains to be compacted so that the thickness of the layer is somewhat reduced but, in practice, the porosity of the layer has not been much reduced because the cores of the grains remain substantially in their original shape during sintering, only the ductile coatings being interlocked to produce a mechanically stable body of very high porosity.

The good electrical conductivity of the porous body, which is very important for their use as electrodes, is assured when the coatings 2 consist of metals having a good electrical conductivity.

The core material may be coated with the ductile material in any suitable manner and many conventional coating methods are available for this purpose. For instance, if the core material is electrically conductive, it may be advantageous to deposit the ductile material galvanically on the grains as disclosed in the British Patent No. 871,276, granted on June 28, 1961. Hot or pot galvanization may also be used, wherein the brittle material grains are immersed in a metal melt. For special purposes, the powder grains could be amalgamated. Furthermore, the powder grains may be contacted with a metal compound and the compound is reduced to deposit the metal on the grains. Similarly, the grains may be contacted with a gaseous inorganic or organic metal compound and the compound is thermally decomposed to deposit the metal on the grain surfaces. Another useful coating method is the vacuum evaporation of the ductile material onto the grain surfaces, such as used in the production of mirrors. Finally, use may be made of the fact that a less noble metal displaces a more noble metal in a solution, the more noble metal being precipitated on the less noble metal. Thus, if a powder of a less noble metal is immersed into a solution of a more noble metal, the latter will precipitate onto the powder surfaces.

These and other conventional coating methods are for instance described in (1) Mayer, H. "Physik dünner Schichten" Wissenschaftliche Verlangsgesellschaft, Stuttgart, Germany, 1950.

(2) Wiederholt, W. "Aufdampfen" Jahrbuch der Oberflächentechnik, 1958, Metallverlag Berlin.

(3) Winnacker-Küchler "Chemische Technologie," volume 5 (pp. 595–611) Carl Hanser Verlag, Muñchen, 1961.

While in no way restricted thereto, the invention will be further illustrated in the following specific examples:

*Example 1*

Twenty grams of iron powder having an average grain diameter of about $200\mu$ to $300\mu$ were immersed in a saturated copper sulfate solution, causing the iron powder grains to be immediately coated with a thin film of metallic copper. The coated iron powder grains were removed from the solution, washed with running water, and, while still wet, placed into a press having a press platen with a diameter of 40 mm. The press was heated to a temperature of 400° C. in a nitrogen atmosphere and the powder was simultaneously pressed in the heated press under a pressure of 1 t./sq. cm.

The resultant sintered body was cut into sample strips to test the tensile strength of the body. It was found to be 200 kg./sq. cm.

A corresponding body was produced under the same conditions from the same iron powder with copper coating, but half of the powder volume was supplied by copper powder with a diameter of $3\mu$ to $8\mu$. The tensile strength of the sample strips was found to be about 210 kg./sq. cm.

A corresponding body was produced under the same conditions from the same iron powder but without copper coating. The tensile strength of the body was so low that it crumbled readily when pressed between the finger tips of a tester.

*Example 2*

Quartz powder having an average grain size of about $50\mu$ to $130\mu$ was charged into a conventional vacuum evaporation apparatus wherein the powder was subjected under a high vacuum to a silver vapor while being agitated. The resultant powder grains were covered with a film of silver having average thickness of $3.6\mu$.

The coated quartz powder was pressed and heated in the same press as used in Example 1 at a temperature of 400° C. and a pressure of 1.5 kg./sq. cm., in a nitrogen atmosphere, to produce a plate having a thickness of 3.2 mm. and a diameter of 40 mm. The porosity of the plate was 45%.

An active mass of nickel hydroxide was deposited in the plate pores in a manner as disclosed in U.S. Patent No. 2,658,099, granted to L. P. Basset on November 3, 1953, and the resultant electrode plate was tested in an open galvanic cell having an electrolyte consisting of 23 percent solution of KOH in water and cadmium counter-electrode, showing a discharge capacity of 0.85 ampere-hour at the 5-hour rate.

When the same device was run under the same conditions with an electrode plate of the same size and mechanical strength but consisting solely of silver powder, the output was reduced to 69% of the above indicated output.

*Example 3*

The intermetallic aluminum nickel alloy AlNi was used as core material. It is of particular usefullness because of its low specific gravity and its good electrical conductivity but it cannot be used by itself because it is difficult to sinter. Therefore, the grains of the aluminum-nickel powder having an average diameter of about $100\mu$ to $150\mu$ were coated by subjecting them to a treatment with volatile nickel carbonyl and subsequently decomposing the nickel carbonyl by heat (Mond-Langer process, see U.S. Patent No. 2,887,088).

The resultant coated grains were sintered like pure carbonyl nickel grains to produce a sintered body of less specific gravity than a sintered body of nickel, having a pore volume of 67%.

*Example 4*

16 g. of bismuth telluride having a grain size of about $20\mu$ to $50\mu$ are immersed in an ammoniacal solution of $AgNO_3$, which is rapidly stirred. When adding an aqueous solution of formaldehyde (30 percent as a reducing agent the grains are coated with a film of silver. Having washed with water and dried the bismuth telluride powder has a weight of 17.2 g.

This quantity is intimately mixed with 10.5 g. of a powdered Raney silver alloy composed of 65% by weight of silver and 35% by weight of aluminum and having a particle size between $5\mu$ and $8\mu$.

This mixture of powders was then compression-molded to form a plate-shaped electrode, which was subsequently activated in a 10-N aqueous KOH-solution at 60° C. in order to obtain an activated oxygen electrode with Raney silver.

This electrode is operated in 5-N KOH with an oxygen pressure of 1.2 kg./sq. cm. as a diffusion electrode in a fuel cell.

It establishes the rest potential of 1.10 volts with respect to the hydrogen electrode. A current density of 100 ma./sq. cm. can be drawn from the electrode at 20° C. with a polarisation of only 0.34 volt.

The porosity of the sintered bodies may be increased in a conventional manner by mixing a leachable filler as, for instance, salts, zinc, magnesium, aluminum and other materials, which are dissolved by water, acids and lyes.

To cover grains of a non-conductive or semi-conductive material it is advantageous to use physical coating methods at first. Then the second coating layer may be produced in electrochemical ways using the same or a second coating material and giving the coating film the desirable thickness.

As indicated hereinabove, the sintered bodies of this invention have great mechanical strength, despite their high porosity, which is a most useful characteristic for sintered skeleton-electrodes. For this reason, such bodies may be advantageously used, for instance, in fuel cells as the gas conducting layer in a double-skeleton catalyst electrode, which constitutes the major volume and weight of the electrode. Instead of using for this purpose carbonyl nickel and a filler, as has been conventional, the sintered body of Example 3 will give excellent results in reducing the weight of this component.

While the invention has been described and illustrated in connection with certain preferred embodiments thereof, it will be clearly understood that many modifications and variations may occur to those skilled in the art, particularly after benefiting from the present teaching, without departing from the spirit and scope of this invention defined in the appended claims.

We claim:
1. A porous, electrically conductive, mechanically self-sustaining, sintered electrode comprising
 a core of an inter-metallic aluminum nickel compound AlNi, substantially undeformable under sintering conditions of a powder of brittle particled material of said compound and an electrically conductive, ductile metal coating surrounding at least a major portion of each of the particled materials of the core.
2. The electrode of claim 1 which has a coating of one of the following materials: nickel, lead, cobalt, copper, silver, platinum or alloys thereof.
3. The electrode of claim 1 which has a metal coating of two current-conducting layers.

References Cited by the Examiner
UNITED STATES PATENTS

| Re. 22,373 | 9/1943 | Benner et al. | 75—212 X |
| 747,454 | 12/1903 | Lowendahl | 75—201 |
| 2,646,456 | 7/1953 | Jacquier | 75—212 |

FOREIGN PATENTS 827,016  1/1960  Great Britain.

LEON D. ROSDOL, *Primary Examiner.*
REUBEN EPSTEIN, CARL D. QUARFORTH,
*Examiners.*
R. L. GOLDBERG, R. L. GRUDZIECKI,
*Assistant Examiners.*